United States Patent [19]

Bass et al.

[11] Patent Number: 5,870,733
[45] Date of Patent: Feb. 9, 1999

[54] AUTOMATED SYSTEM AND METHOD FOR PROVIDING ACCESS DATA CONCERNING AN ITEM OF BUSINESS PROPERTY

[75] Inventors: Theresa A. Bass, Wylie; Kerry D. Brinlee, Dallas, both of Tex.

[73] Assignee: Electronic Data Systems Corporation, Plano, Tex.

[21] Appl. No.: 663,959

[22] Filed: Jun. 14, 1996

[51] Int. Cl.[6] .................................................. G06F 17/30
[52] U.S. Cl. .................................. 707/2; 707/3; 707/10; 707/102; 707/103; 705/2; 705/4; 705/28; 705/29
[58] Field of Search ................................. 707/3, 103, 10, 707/102, 2; 705/2, 4, 28, 29

[56] References Cited

U.S. PATENT DOCUMENTS

| | | | |
|---|---|---|---|
| 4,864,497 | 9/1989 | Lowry et al. ............................. | 707/102 |
| 4,876,643 | 10/1989 | McNeill et al. ......................... | 395/290 |
| 5,191,522 | 3/1993 | Bosco et al. ............................. | 705/4 |
| 5,303,227 | 4/1994 | Herold et al. ........................... | 370/276 |
| 5,321,423 | 6/1994 | Yoshizawa et al. ..................... | 345/507 |
| 5,367,695 | 11/1994 | Narad et al. ............................. | 395/200 |
| 5,432,931 | 7/1995 | Woess et al. ............................. | 707/10 |
| 5,437,027 | 7/1995 | Bannon et al. .......................... | 707/103 |
| 5,491,820 | 2/1996 | Belove et al. ............................ | 707/3 |
| 5,664,109 | 9/1997 | Johnson et al. ......................... | 705/2 |
| 5,673,382 | 9/1997 | Cannon et al. .......................... | 395/182.04 |
| 5,680,640 | 10/1997 | Ofek et al. ............................... | 395/839 |

OTHER PUBLICATIONS

Master and slave database servers–Janne Saarela, METDST May 16, 1995.

*Primary Examiner*—Wayne Amsbury
*Assistant Examiner*—Shahid Alam
*Attorney, Agent, or Firm*—Barton E. Showalter; Christopher W. Kennerly; L. Joy Griebenow

[57] ABSTRACT

An automated system (10) for providing access data (42) concerning an item of business property includes a master database (34) containing master data (36) concerning the item and an accesser (16) that provides an access request. A manager (14) coupled to the master database (34) retrieves selected master data (36) from the master database (34) and generates access data (42) for the item using the master data (36). The manager (14) receives the access request and, in response, provides the accesser (16) with access data (42) concerning the item.

20 Claims, 7 Drawing Sheets

FIG. 3a

| | | 36 | | | |
|---|---|---|---|---|---|
| 202 | ITEM NUMBER | B11111211 | A00000139 | C12121377 | ... |
| 204 | ITEM TYPE | LASER PRINTER | COMPUTER | COMPUTER | |
| 206 | SBU | 210 | 300 | 210 | |
| 208 | LOCATION | NE-35 | SE-22 | TXPLAD | |
| 210 | MODIFY DATES | 09/1/95 | | 06/15/96;11/12/93 | |
| 212 | MODIFIERS | KEN | | BARB; JOE | |
| 214 | RETIRE | ✓ | | | |
| 216 | EXCESS | | | ✓ | |
| 218 | CONTACT | ART | LEE | WALTER | |
| 220 | COMMUNICATIONS | 9-2379 | LEE@EDS.COM | 8-7639 | |
| | ... | | | | |

FIG. 3b

| | | 74 | | |
|---|---|---|---|---|
| 202 | ITEM NUMBER | B11111211 | C12121377 | ... |
| 204 | ITEM TYPE | LASER PRINTER | COMPUTER | |
| 206 | SBU | 210 | 210 | |
| 208 | LOCATION | NE-35 | TXPLAD | |
| 210 | MODIFY DATES | 09/1/95 | 06/15/96;11/12/93 | |
| 212 | MODIFIERS | KEN | BARB; JOE | |
| 214 | RETIRE | ✓ | | |
| 216 | EXCESS | | ✓ | |
| 218 | CONTACT | ART | WALTER | |
| 220 | COMMUNICATIONS | 9-2379 | 8-7639 | |
| | ... | | | |

FIG. 3c

| 42 | | |
|---|---|---|
| 202 — ITEM NUMBER | C12121377 | ○ ○ ○ |
| 204 — ITEM TYPE | COMPUTER | |
| 206 — SBU | 210 | |
| 208 — LOCATION | TXPLAD | |
| 210 — MODIFY DATES | 06/15/96;11/12/93 | |
| 212 — MODIFIERS | BARB; JOE | |
| 214 — RETIRE | | |
| 216 — EXCESS | ✓ | |
| 218 — CONTACT | WALTER | |
| 220 — COMMUNICATIONS | 8-7639 | |
| ○ ○ ○ | | |

FIG. 5

START
↓
ACCESSER GENERATES AN ACCESS REQUEST — 400
↓
ACCESSER COMMUNICATES ACCESS REQUEST — 402
↓
MANAGER RECEIVES ACCESS REQUEST — 404
↓
MANAGER PROVIDES ACCESSER WITH ACCESS TO SELECTED ACCESS DATA — 406
↓
MANAGER RECEIVES AN ITEM REQUEST FROM ACCESSER — 408
↓
MANAGER MATCHES AN EXCESS OR AVAILABLE ITEM TO A RECIPIENT — 410
↓
END

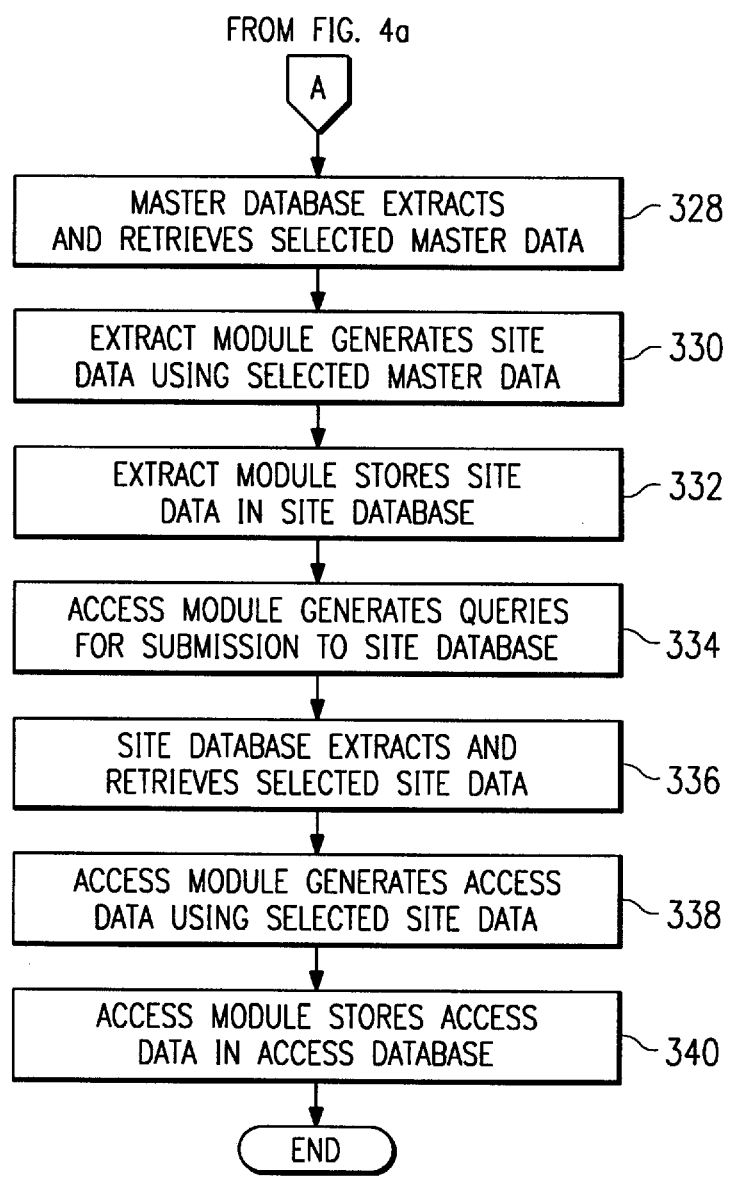

AUTOMATED SYSTEM AND METHOD FOR PROVIDING ACCESS DATA CONCERNING AN ITEM OF BUSINESS PROPERTY

TECHNICAL FIELD OF THE INVENTION

This invention relates in general to the field of data communications, and more particularly to an automated system and method for providing access data concerning an item of business property.

BACKGROUND OF THE INVENTION

Many organizations provide access to information concerning items of business property according to the needs of the organization, the characteristics of the items, and the security credentials associated with persons or entities that desire such access. It is often desirable to provide access to selected information concerning items of business property in response to a request or other information provided by an accesser. For example, an accesser might request access to selected information concerning excess items to match a particular excess item to a recipient within or outside the organization.

As organizations become larger and more complex to serve a variety of internal and external information requirements, organizations may provide access to selected information concerning items of business property using various techniques. A known technique for providing access to selected information concerning an item of business property uses manual request, authorization, information gathering, and information delivery processes that are often relatively slow, labor intensive, and equipment intensive. In addition, information concerning these items may not be maintained in a location that allows sufficient access by potential recipients.

As a result, accessing the selected information may require several days, causing consequent backlogs and undesirable delays, and matching an excess item to a recipient may be performed inadequately, improperly, or not at all. Furthermore, information concerning items that is not properly updated may result in improper payment or nonpayment of property taxes, lease, maintenance, license, and other recurring or other payment obligations, improper depreciation determinations, and unsatisfactory use of available equipment resources. Moreover, organizations using such techniques may have little flexibility to support internal or external time, space, and equipment constraints.

SUMMARY OF THE INVENTION

In accordance with the present invention, the disadvantages and problems associated with systems and methods for providing access data concerning items of business property have been substantially reduced or eliminated.

In accordance with one embodiment of the present invention, an automated system for providing access data concerning an item of business property includes a master database containing master data concerning the item and an accesser that provide an access request. A manager coupled to the master database retrieves selected master data from the master database and generates access data for the item using the master data. The manager receives the access request and, in response, provides the accesser with access data concerning the item.

Important technical advantages of the present invention include providing an automated system and method for providing access data concerning an item of business property that incorporates automated request, information retrieval, and information delivery processes to give organizations the ability to provide access to selected information in an efficient, timely and accurate manner. The present invention decreases the transaction time for accessing such information and for matching an excess item to a recipient, and may further decrease manpower requirements associated with these processes.

The present invention also enhances the ability of the organization to properly track and update inventory and other information, determine property taxes and equipment depreciation, and address lease, maintenance, license, and other payment obligations associated with items owned or otherwise under the control or supervision of the organization. As a result, the present invention enhances the ability of the organization to respond to internal and external equipment needs and storage constraints. Other technical advantages are readily apparent to one skilled in the art from the following figures, descriptions and claims.

BRIEF DESCRIPTION OF THE DRAWINGS

For a more complete understanding of the present invention and for further features and advantages thereof, reference is now made to the following description taken in conjunction with the accompanying drawings, in which:

FIGS. 3a through 3c illustrate exemplary master, site, and access data, respectively;

FIG. 4a and 4b illustrates an exemplary method for selecting information concerning an item of business property for access by an accesser;

FIG. 5 illustrates an exemplary method for providing access to selected information concerning an item of business property.

DETAILED DESCRIPTION OF THE INVENTION

Figure 1:
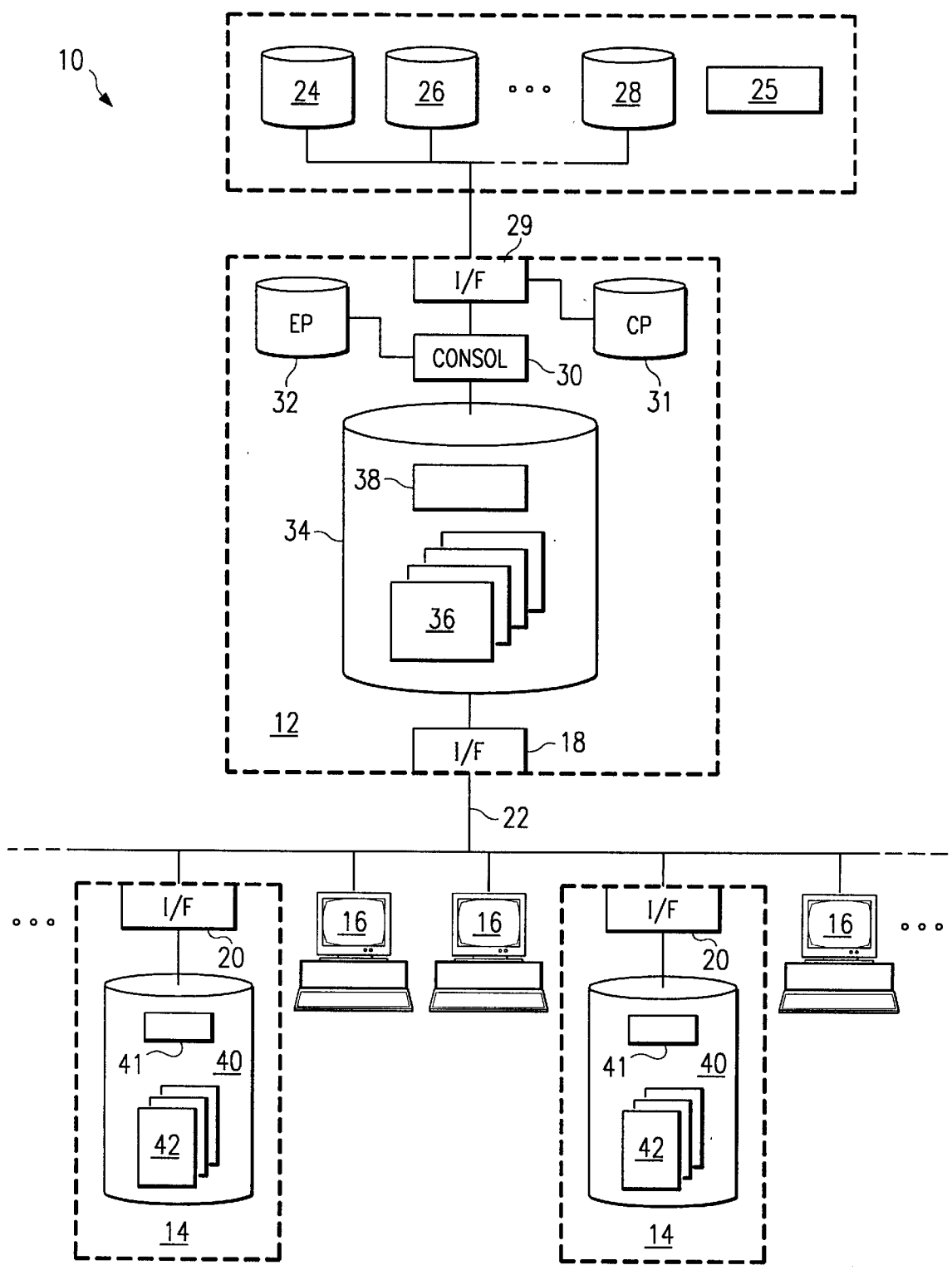
FIG. 1 illustrates an exemplary automated system for providing access data concerning an item of business property according to the teachings of the present invention.

FIG. 1 illustrates an exemplary automated system 10 for providing access to selected information concerning an item of business property that includes consolidation system 12, one or more managers 14, one or more accessers 16, a network 22, and system databases 24, 26, and 28. For various reasons, one or more accessers 16 may not have access to some or all of the information contained in system databases 24, 26, and 28. For example, system databases 24, 26, and 28 may contain secure business information that is accessible only to selected persons or devices within the organization. Each manager 14 may provide one or more accessers 16 with access to selected information contained in system databases 24, 26, and 28 in response to access requests communicated from accessers 16.

There may be a heirarchical or other coordinated relationship between some or all of the managers 14, such that particular managers 14 may coordinate, control, or otherwise direct other managers 14 in providing accessers 16 with access to the selected information. For example, accessers 16 may each be associated with and may communicate access requests to a particular manager 14 that provides those accessers 16 with access to the selected information. Each accesser 16 may communicate access requests to a coordinating manager 14 that directs the access requests to a particular manager 14 assigned to or otherwise associated with the accesser 16. Each accesser 16 may communicate access requests to a coordinating manager 14 that provides the accesser 16 with access to selected information after receiving selected information from another manager 14. Managers 14 may combine in any suitable manner to provide accessers 16 with access to selected information contained in system databases 24, 26, and 28.

Through the coordinated activities of managers 14, system 10 provides accessers 16 with access to selected information concerning items of business property that the accessers 16 might not otherwise have, while maintaining the integrity and security of the stored information from which the selected information is derived or that the selected information represents. Once accessers 16 have access to the selected information, accessers 16 may interact with managers 14 to browse, view, examine, consult, act upon, download, or otherwise operate on the selected information. In one embodiment, accessers 16 may communicate access requests to managers 14 to access information concerning excess or other items available for matching to recipients associated with accessers 16 in some manner.

Managers 14 and accessers 16 may be any logical entities in hardware and/or software, such as mainframes, miniframes, or personal computers, that send and receive information using network 22. Managers 14 and accessers 16 may be autonomous or operated by one or more employees, agents, representatives, managers, operators, or other persons associated with the organization that may provide or seek access, respectively, to information concerning items of business property. The present invention contemplates as many managers 14 and accessers 16 as are necessary or desirable according to the needs of the organization or other factors.

System databases 24, 26, and 28 contain accounting, inventory, and other business information concerning one or more items that may each be any tangible or intangible equipment or other business property owned, leased, managed, maintained, or otherwise under the control or supervision of the organization. System databases 24, 26, and 28 may each include one or more databases, files, or other data repositories at a single or multiple locations internal or external to consolidation system 12. System databases 24, 26, and 28 may be more or less permanent or may be temporary databases, files, or data repositories created by extracting information from more permanent databases, files, or data repositories. System databases 24, 26, and 28 may be a single database or otherwise integral to one another. System databases 24, 26, and 28 support a database management system (DBMS) 25 that manages access to the resources of system databases 24, 26, and 28. Although system databases 24, 26, and 28 are discussed, the present invention contemplates more or fewer system databases according to the needs of the organization or other factors.

In one embodiment, system database 24 contains tax, accounting, and other information concerning fixed assets of the organization, which may include, without limitation: net book values; book basis values; periodic, accumulated, or other depreciation figures; strategic business unit (SBU) or other identifiers corresponding to individuals, groups, divisions, centers, departments, or other areas of expenditure within the organization; and other suitable business information. System database 26 contains information concerning the inventory of the organization and the tracking of items not owned by the organization but for which the organization may incur lease, maintenance, license, or other expenditures during the life of the items or the organization. System database 28 contains information concerning recurring payments against assets, such as lease payments, maintenance costs, license fees, payment frequencies, and any other suitable information relating to the ongoing relationship between the items and the organization.

System databases 24, 26, and 28 may be relational databases that store information in tables containing rows and columns of data. The rows of a table represent records, which are collections of information about separate items, and the columns represent fields, which are attributes of the records. In executing queries to retrieve information, system databases 24,. 26, and 28 match information from a field in a first table with information in the corresponding field of a second table to produce a third table that combines requested data from the first and second tables. In general, system databases 24, 26, and 28 use matching values in two tables to relate information in one table to information in the other table. The present invention contemplates system databases 24, 26, and 28 storing and retrieving data in any suitable manner. Where system databases 24, 26, and 28 are relational databases, DBMS 25 associated with databases 24, 26, and 28 may be a relational DBMS (RDBMS).

Consolidation system 12 is coupled to system databases 24, 26, and 28 and includes a consolidate module 30, interfaces 18 and 29, a master database 34, and databases 31 and 32 to store communication parameters and extraction parameters, respectively. Consolidate module (CONSOL) 30 generates one or more queries for submission to system databases 24, 26, and 28 to extract and retrieve selected business information from system databases 24, 26, and 28. In one embodiment, the queries are Structured Query Language (SQL) statements that provide instructions to system databases 24, 26, and 28 and associated DBMS 25 regarding the extraction of information from system databases 24, 26, and 28 and the subsequent handling of the extracted information. Consolidate module 30 may generate queries for submission to a single or multiple system databases 24, 26, and 28. Consolidate module 30 may generate queries for submission to particular system databases 24, 26, or 28 serially, more or less simultaneously, or in any other temporal or other suitable relationship.

Consolidate module 30 generates queries for submission to system databases 24, 26, and 28 in accordance with one or more extraction parameters 32 that may include, without limitation: specified times or intervals at which consolidate module 30 is to generate queries; specified events that may trigger, signal, or otherwise cause consolidate module 30 to generate queries; specified items or categories of items for which consolidate module 30 is or is not to generate queries; and any other criteria or other information suitable for consolidate module 30 to use in generating queries for submission to master database 34. For example, extraction parameters 32 may specify a weekly or other periodic extraction and retrieval from system databases 24, 26, and 28 of all business information concerning items that the organization has not retired in some manner, such as by disposal, employee gift, donation, sale, or other suitable disposition, or may wish to track or monitor for any reason.

Consolidate module 30 is coupled to and interacts with system databases 24, 26, and 28 using interface 29. Interface 29 may be any suitable mechanism for allowing consolidate module 30 and system databases 24, 26, and 28 to communicate information with another. Interface 29 may include appropriate hardware and software to communicate using a direct connection to a public switched telephone network (PSTN), a connection through a local area network (LAN), metropolitan area network (MAN), wide area network (WAN), or other network, or any other communications connection suitable for accessing system databases 24, 26, and 28 at one or more locations. Interface 29 may also include protocol conversion and some data processing capabilities that allow interface 29 to facilitate data communications between consolidate module 30 and system databases 24, 26, and 28.

Interface 29 may access communication parameters 31 to communicate information between system databases 24, 26, and 28 and consolidate module 30. For each database, file, or other data repository associated with system databases 24, 26, and 28, communication parameters 31 maintain access information that may include, without limitation: a username, a password, a telephone number, communication port settings, database specifications, library and file names, directory paths, library and file paths, protocol information, and any other information suitable for accessing system databases 24, 26, and 28 and communicating information between system databases 24, 26, and 28 and consolidate module 30.

Consolidate module 30 generates master data 36 for items using business information retrieved from system databases 24, 26, and 28, and stores master data 36 using master database 34. Master data 36 for each item may be identical to, duplicate, match, resemble, or otherwise represent, in whole or in part, the business information corresponding to the particular item in system databases 24, 26, and 28. Master data 36 may wholly or partially overlay, replace, or combine in some manner with previous master data 36 stored in master database 34. In a particular embodiment, consolidate module 30 directly stores retrieved business information as master data 36 in master database 34.

Master database 34 may be a relational or other database that supports a RDBMS or other DBMS 38, as the case may be. Master data 36 for a particular item may be identified using one or more identifiers associated with the item, according to relational database or other techniques. In one embodiment, at least one of the items for which master database 34 contains master data 36 is an excess item that, although operable, is not needed by an individual, group, department, site, division, SBU, or other area of expenditure with which the item is presently associated, an item for which there exists a higher priority elsewhere within or outside the organization, or an item that is otherwise available for allocation to a recipient. Exemplary master data 36 for excess and other items of business property is discussed below with reference to FIG. 3a.

Consolidation system 12 and master database 34 are coupled to and interact with one or more managers 14 using interface 18, network 22, and interfaces 20. Interface 18 and interfaces 20 may be similar in design and function those discussed above in connection with interface 29. Network 22 may include any suitable wireline or wireless links to couple interface 18 to one or more interfaces 20 associated with managers 14. For example, network 22 may include a PSTN, a LAN, MAN, WAN, or other network, or any other communications connection at one or more locations to facilitate data communications between interface 18 and interfaces 20 associated with managers 14.

One or more managers 14 receive selected master data 36 retrieved from master database 34 and generate access data 42 for items using some or all of the retrieved master data 36. In one embodiment, each manager 14 may receive master data 36 that corresponds to an individual, group, division, department, site, center, SBU, or other area of expenditure within the organization that is associated with manager 14. Manager 14 may also receive master data 36 from another manager 14. Reference to a particular manager 14 is intended to apply equally to all managers 14, unless otherwise indicated.

Each manager 14 generates access data 42 for items using the retrieved master data 36 and stores access data 42 using a corresponding access database 40. Manager 14 may generate access data 42 for the items that is identical to or duplicates, matches, resembles, or represents corresponding master data 36. Access data 42 may wholly or partially overlay, replace, or combine in some manner with previous access data 42 stored in access database 40. In a particular embodiment, manager 14 directly stores selected master data 36 as access data 42 in access database 40.

Access database 40 may be a relational or other database that supports a RDBMS or other DBMS 41, as the case may be. In one embodiment, some or all of the items for which access database 40 contains access data 42 are excess or other items that are available for matching to recipients within or outside the organization. Exemplary access data 42 for excess or otherwise available items is discussed below with reference to FIG. 3c.

In operation, consolidate module 30 generates queries in accordance with extraction parameters 32 to extract and retrieve selected business information from system databases 24, 26, and 28 using interface 29 and communication parameters 31. Consolidate module 30 generates master data 36 for items using the retrieved business information and stores master data 36 using master database 34. Each record within master database 34 may contain master data 36 for a particular item and may be identified using a unique item identifier associated with the item.

One or more managers 14 access master database 34 using interfaces 20, network 22, and interface 18. In cooperation with DBMS 38, each manager 14 may extract and retrieve from master database 34 some or all master data 36 corresponding to the manager 14, generate access data 42 for items using master data 36, and store access data 42 using access database 40. Each manager 14 may then provide one or more accessers 16 with access to access data 42 in response to access requests communicated from accessers 16.

Accessers 16 interact with managers 14 to browse, view, examine, consult, act upon, download, or otherwise operate on access data 42 to match excess or otherwise available items to recipients associated with accessers 16. In response to access requests and other local operations, managers 14 can add, delete, complete, modify, or otherwise operate on access data 42 to generate updated master data 36 for communication to master database 34, updated business information for communication to system database 24, 26, and 28, or other information for communication to persons or devices external to system 10.

Figure 2:
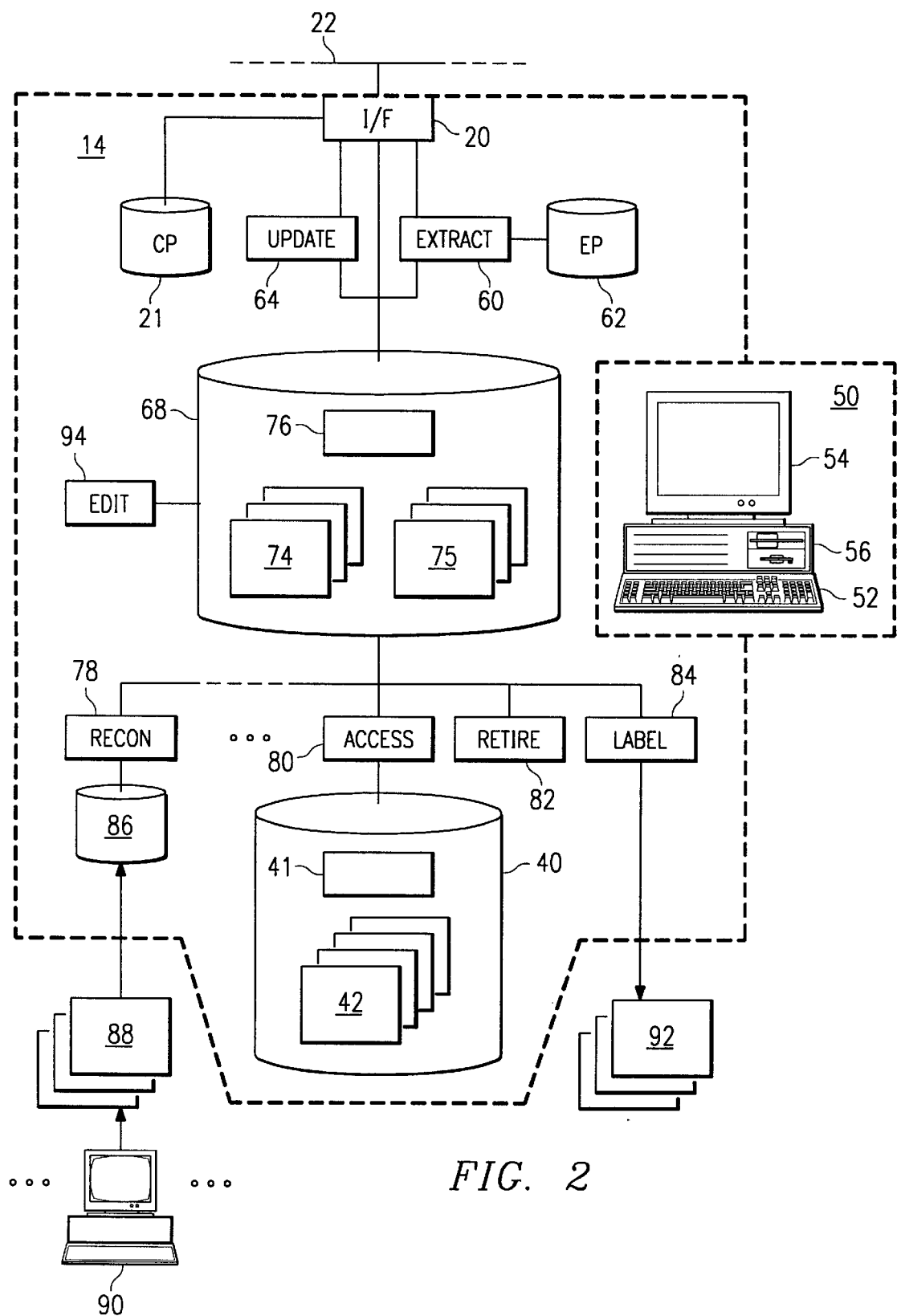
FIG. 2 illustrates an exemplary manager according to the present invention.

FIG. 2 illustrates in more detail manager 14 that includes an extract module 60 that is coupled to and interacts with interface 20, network 22, interface 18, inventory database 34, and associated DBMS 38 to extract and retrieve master data 36 from master database 34 according to queries generated for submission to master database 34. The queries may be SQL statements that provide instructions to master database 34 and DBMS 38 regarding the extraction of information from master database 34 and the subsequent handling of the extracted information. Extract module 60 may generate queries for master data 36 corresponding to one or more items serially, more or less simultaneously, or in any other temporal relationship.

Extract module 60 generates queries for submission to master database 34 according to one or more extraction parameters 62 that may be similar to extraction parameters 32 discussed above in connection with FIG. 1. For example, extraction parameters 62 may specify a weekly extraction of master data 36 for items associated with an individual, group, division, department, site, center, SBU, or other area of expenditure corresponding to manager 14. Extraction parameters 62 may specify an extraction of master data 36 for items having master data 36 that was created or modified, in whole or in part, before, on, after, or between one or more specified dates or in a specified manner.

Interface 20 may access one or more communication parameters 21 that are similar to communication parameters 31 to communicate queries and other information between extract module 30 and master database 34. Interface 18 may communicate the retrieved master data 36 to manager 14 in any suitable manner, for example, using file transfer protocol (FTP), X.25 protocol, or any other synchronous or asynchronous communications protocol or technique.

Extract module 60 generates site data 74 for items using retrieved master data 36 and stores site data 74 in site database 68. Site database 68 may be a relational or other database that supports a RDBMS or other DBMS 76, as the case may be. Site data 74 for items may be identical to or may duplicate, match, resemble, or otherwise represent, in whole or in part, the corresponding master data 36. Site data 74 may wholly or partially overlay, replace, or combine in some manner with previous site data 74 stored in site database 68. Extract module 60 may directly store retrieved master data 36 as site data 74 in site database 68. In one embodiment, at least one of the items for which site database 68 contains site data 74 is an excess or otherwise available item that is located at, under the control or supervision of, or otherwise associated with an individual, group, department, site, division, center, SBU, or other area of expenditure corresponding to manager 14.

Although manager 14 may extract and retrieve master data 36 from master database 34 in the manner discussed above to generate site data 74, the present invention contemplates manager 14 extracting and retrieving business information directly or indirectly from system databases 24, 26, and 28 to generate site data 74. Whether manager 14 generates site data 74 using business information in system databases 24, 26, and 28 or master data 36 that represents business information retrieved from system databases 24, 26, and 28, manager 14 uses site data 74 to provide accessers 16 with access to selected information concerning items of business property. Exemplary site data 74 for excess and other items associated with manager 14 is discussed below with reference to FIG. 3*b*.

Site database 68 may also contain site comparison data 75 for items that reflects various comparisons concerning the corresponding master data 36 or site data 74. For example, site comparison data 75 for an item may be generated according to a comparison of master data 36 for the item with previous master data 36 for the item, if any, a comparison of master data 36 for the item with previous site data 74 for the item, if any, or any other suitable comparison. Because site comparison data 75 reflects comparisons between master data 36 and previous master data 36 or previous site data 74, site comparison data 75 may reflect activity, such as addition, completion, deletion, modification, or any other operation, concerning some or all of the corresponding business information, master data 36, or site data 74, performed by persons or components associated with manager 14, consolidation system 12, or system databases 24, 26, and 28. Site comparison data 75 may wholly or partially overlay, replace, or combine in some manner with previous site comparison data 75 stored in site database 68.

Manager 14 includes a reconcile module 78, an access module 80, a retire module 82, a label module 84, an update module 64, and an edit module 94 that are coupled to and interact with site database 68 to process, manipulate, or provide access to site data 74 and site comparison data 75. Reconcile module 78, access module 80, retire module 82, label module 84, update module 64, and edit module 94 may interact with site database 68 serially, more or less simultaneously, or in any other temporal relationship. The present invention contemplates as many modules, functions, or components as are necessary or desirable according to the needs of the organization. Persons or components associated with manager 14 may access site database 68 to browse, view, examine, act upon, download, store, or otherwise manipulate site data 74 or site comparison data 75 in accordance with the operation of manager 14. Edit module 94 allows manager 14 or a user of manager 14 to access, modify, create, generate, supplement, update, or otherwise perform an activity on site data 74 or site comparison data 75.

Reconcile module 78 is coupled to and interacts with an audit database 86 containing audit data 88 received from one or more auditors 90. In one embodiment, audit database 86 contains audit data 88 that identifies items that auditors 90 have determined are physically located at or otherwise associated with the site or other area of expenditure corresponding to manager 14. For example, an auditor 90 may generate audit data 88 using a bar code scanner or other device to physically scan or read bar codes that are affixed to items located at the site to generate or verify inventory information for the site. Auditor 90 may then upload audit data 88 from the scanner or otherwise communicate audit data 88 to manager 14 for storage using audit database 86.

Reconcile module 78 compares audit data 86 with the corresponding site data 74 or site comparison data 75 in site database 68 to audit, verify, check, or otherwise determine the completeness, accuracy, integrity, or other characteristics of site data 74 or site comparison data 75. Reconcile module 78 may generate reports according to the comparison for communication to persons or components associated with system 10 in some manner. Persons or components associated with manager 14 may modify site data 74 or site comparison data 75 according to the comparison using edit module 94. In one embodiment, if site data 74 or site comparison data 75 is modified, reconcile module 78 associates an update indicator with the appropriate data in site database 68 to indicate the existence and possibly the nature or content of the modification.

Access module 80 is coupled to and interacts with site database 68 and DBMS 76 to extract and retrieve site data 74 for items from site database 68 according to queries generated for submission to site database 68 in a similar manner to that discussed above in connection with extract module 60 and master database 34. In one embodiment, the items for which access module 80 extracts site data 74 include excess or other items that, in addition to being associated with the site or other area of expenditure corresponding to manager 14, are available for matching to recipients within or outside the organization.

Access module 80 generates access data 42 for items using the corresponding site data 74 and stores access data 42 in access database 40 in the manner discussed above with reference to FIG. 1. Access module 80 may merely communicate some or all of the retrieved site data 74 for storage in access database 40 to generate access data 42. Alternatively, access module 80 may flag site data 74 corresponding to items within site database 68 to generate access data 42, rather than extracting and retrieving site data 74 from site database 68 to generate access data 42. In that case, site database 68 contains access data 42 instead of, or in addition to, access database 40.

As discussed above with reference to FIG. 1, manager 14 provides an accesser 16 with access to access data 42 in response to an access request communicated from accesser 16. An access request may be an electronic mail message, network message, or other communication from accesser 16 to manager 14, a communication from accesser 16 to multiple managers 14, or accesser 16 logging into or otherwise accessing the facilities of network 22. Manager 14 may provide accesser 16 with access to access data 42 within access database 40 or site data 74 within site database 68 having an appropriate flag, if any. Furthermore, as discussed above with reference to FIG. 1, manager 14 may cooperate or coordinate with, may instruct, control, or direct, or may receive instructions or directions from other managers 14 to provide accesser 16 with access to access data 42.

An item request may accompany each access request to specify an item or type of item that a recipient associated with accesser 16 may need or desire. Manager 14 may match the item to a recipient in any manner described in copending Application Ser. No. 08/664,332, entitled "Automated System and Method for Matching an Item of Business Property to a Recipient," filed Jun. 14, 1996 now pending. If manager 14 matches an item to a recipient, access module 80 may modify the corresponding site data 74 or site comparison data 75 in some manner to reflect a different individual, group, department, division, center, site, SBU, or other location or area of expenditure associated with or responsible for the item; a different contact identifier or communications information associated with the different individual, group, department, division, center, site, SBU, or other location or area of expenditure; or any other information concerning the item.

Retire module 82 interacts with site database 68 to initiate the retirement, for example, by disposal, employee gift, donation, sale, or other suitable disposition, of one or more items for which site data 74 or site comparison data 75 includes a retirement indicator. A retirement indicator may be generated by any person or component associated with manager 14 to indicate that retirement of the corresponding item, such as by disposal, employee gift, donation sale, or other disposition, is necessary or desirable according to the needs of the organization. Retirement indicators for one or more items may be generated serially, more or less simultaneously, or in any other manner at one or more times during the operation of system 10.

Label module 84 interacts with site database 68 to generate label data 92 in accordance with data stored in site database 68. Components or devices integral to or separate from manager 14, including label module 84, may use label data 92 to generate printed, bar coded, or other labels for association with items. For example, label module 84 generates label data 92 and associated labels for recently acquired items for which master database 34 contained no previous master data 36 at the time extract module 60 generated site comparison data 75; for items for which a comparison between master data 36 and previous master data 36, if any, indicates that some or all of the previous master data 36 is invalid, inaccurate, incomplete, or inadequate for some reason; or in response to label requests provided by persons or components associated with manager 14 in some manner.

Update module 64 interacts with site database 68 to update master database 34 to reflect additions, deletions, completions, modifications, or other activity concerning site data 74 or site comparison data 75 during the operation of reconcile module 78, access module 80, retire module 82, label module 84, edit module 94, or other components of manager 14. In one embodiment, the heirarchy inherent in the arrangement of consolidation system 12, managers 14, and accessers 16 prevents activity concerning site data 74 and site comparison data 75 from threatening the security or integrity of the business information contained in master database 34 or system databases 24, 26, and 28. As a result, update module 64 may provide a mechanism to ensure that this business information will reflect appropriate activity, while inappropriate activity will not be reflected.

Each manager 14 may operate on one or more computers 50 at one or more locations that are integral to or separate from the hardware and software that support interface 20, site database 34, access database 40, and audit database 86. Computer 50 may include an input device 52, such as a keypad, touch screen, microphone, or other device that can accept information. An output device 54 may convey information associated with the operation of manager 14, including digital or analog data, visual information, or audio information. Both input device 52 and output device 54 may include fixed or removable storage media, such as magnetic computer disks, CD-ROM, or other suitable media to both receive output from and provide input to manger 14. Computer 50 may have one or more processors 56 and associated volatile or non-volatile memory to execute instructions and manipulate information according to the operation of edit module 94, extract module 60, update module 64, reconcile module 78, access module 80, retire module 82, label module 84, and edit module 94 within manager 14.

In operation, extract module 60 generates one or more queries according to one or more extraction parameters 62 to extract and retrieve selected master data 36 from master database 34 using interface 20 and communication parameters 21. Extract module 60 generates site data 74 for items using the retrieved master data 36 and stores site data 74 using site database 68. Each record within site database 68 may contain site data 74 for a particular item and may be identified using a unique item identifier associated with the item. Extract module 60 may also generate site comparison data 75 for items, according to comparisons between master data 36, previous master data 36, and previous site data 74, for storage in site database 68.

Reconcile module 78, access module 80, retire module 82, and label module 84 interact with site database 68 to process, manipulate, or provide access to site data 74 and site comparison data 75. In particular, manager 14 or a user of manager 14 may access, modify, supplement, update, or otherwise perform an activity on site data 74 or site comparison data 75 using edit module 94. Access module 80 generates queries to extract and retrieve site data 74 and site comparison data 75 from site database 68, generates access data 42 for items using site data 74 and site comparison data 75, and stores site data 74 and site comparison data 75 in access database 40. Manager 14 provides accessers 16 with access to access data 42, either alone or in cooperation with or at the direction of one or more other managers 14, in response to access requests communicated from accessers 16. Accessers 16 may interact with managers 14 to browse, view, examine, consult, act upon, download, or otherwise operate on access data 42 to match excess or otherwise available items to recipients associated with accessers 16.

FIGS. 3a through 3c illustrate exemplary master data 36, site data 74, and access data 42, respectively. In one embodiment, each record that contains master data 36, site data 74, or access data 42 corresponds to a particular item and may be identified using a unique item identifier assigned to the item by the organization or otherwise. Although these records may be related to one another using such item identifiers, the present invention contemplates using any suitable field of master data 36, site data 74, or access data 42 to relate the corresponding records to one or more other records, according to relational database or other suitable techniques.

FIG. 3a illustrates records containing master data 36 that may include, for each item, without limitation: an item number or other identifier 202 for the item that is assigned in some manner by the organization or otherwise; an item type 204 that describes the technology, use, or function to which the item may pertain; a manufacturer identifier for the item; a part number assigned to the item by the manufacturer; a serial number for the item; one or more net book, book basis, or other values associated with the item; one or more accumulated, periodic, or other depreciation figures for the item; one or more SBU or other identifiers 206 corresponding to an individual, group, division, center, department, site, or other area of expenditure associated with the item; one or more general or specific location or sublocation identifiers 208 for the item; a purchase order, voucher, or sales order number for the item; a date on which the item was purchased or came under the control or supervision of the organization or an area of expenditure; payment information concerning lease, maintenance, license, and other expenditures that may be incurred during the life of the item or the organization; one or more dates 210 that indicate occasions, if any, on which master data 36 was created or modified, in whole or in part, such as by addition, deletion, completion, or other suitable manner; one or more modifier identifiers 212 that identify persons or components that have created or modified master data 36; a retirement indicator 214 that indicates whether the item has been or is suitable for retirement in some matter; an excess indicator 216 that indicates whether the item is or may be considered an excess or other item available for matching to a recipient; one or more contact identifiers 218 that indicate persons that may be contacted concerning the item; communications information 220 for persons that correspond to contact identifiers 218, such as a telephone number, facsimile number, network address, or other suitable identifier; and any other information concerning the item.

Master database 34 may also contain previous master data 36 that was created, generated, or modified on one or more previous occasions by consolidate module 30, update module 64, or in some other manner. The previous master data 36, if any, may be stored together with or separately from the corresponding master data 36. The records that contain master data 36 and previous master data 36 may further include fields to indicate additions, completions, deletions, modifications, or other activity concerning or comparisons involving master data 36 or previous master data 36.

FIG. 3b illustrates records containing site data 74 that may be identical to or duplicate, match, resemble, or otherwise represent the corresponding master data 36 for one or more items. In one embodiment, for each manager 14, site database 68 contains site data 74 corresponding to items that are associated with manager 14, as discussed above with reference to FIG. 2 and indicated by particular SBU identifiers 206 for the items. Site database 68 may contain records containing site comparison data 75 that corresponds to and reflects comparisons between master data 36, previous master data 36, and previous site data 74. Site database 68 may further contain records that contain information that reflects additions, completions, deletions, modifications, or other activity concerning the corresponding master data 36 or site data 74 for items.

Site database 68 may also contain previous site data 74 or previous site comparison data 75 that was created, generated, or modified on one or more previous occasions by edit module 94, extract module 60, reconcile module 78, access module 80, retire module 82, label module 84, or in some other manner. The previous site data 74 and previous site comparison data 75, if any, may be stored together with or separately from the corresponding site data 74 and site comparison data 75. The records that previous site data 74 and previous site comparison data 75 may include one or more fields to indicate additions, completions, deletions, modifications, or other activity concerning or comparisons involving previous site data 74 or previous site comparison data 75.

FIG. 3c illustrates records containing access data 42 that may be identical to or duplicate, match, resemble, or otherwise represent the corresponding site data 74 or site comparison data 75 for one or more items. In one embodiment, for each manager 14, access database 40 contains access data 42 corresponding to excess or otherwise available items associated with manager 14, as discussed above with reference to FIG. 2 and indicated by excess indicator 216.

Access database 40 may also contain previous access data 42 that was created, generated, or modified on one or more previous occasions by access module 80, accessers 16, or in some other manner. The previous access data 42, if any, may be stored together with or separately from the corresponding access data 42. The records that contain access data 42 and previous access data 42 may include fields to indicate additions, completions, deletions, modifications, or other activity concerning access data 74 or previous access data 36.

Figure 4A:
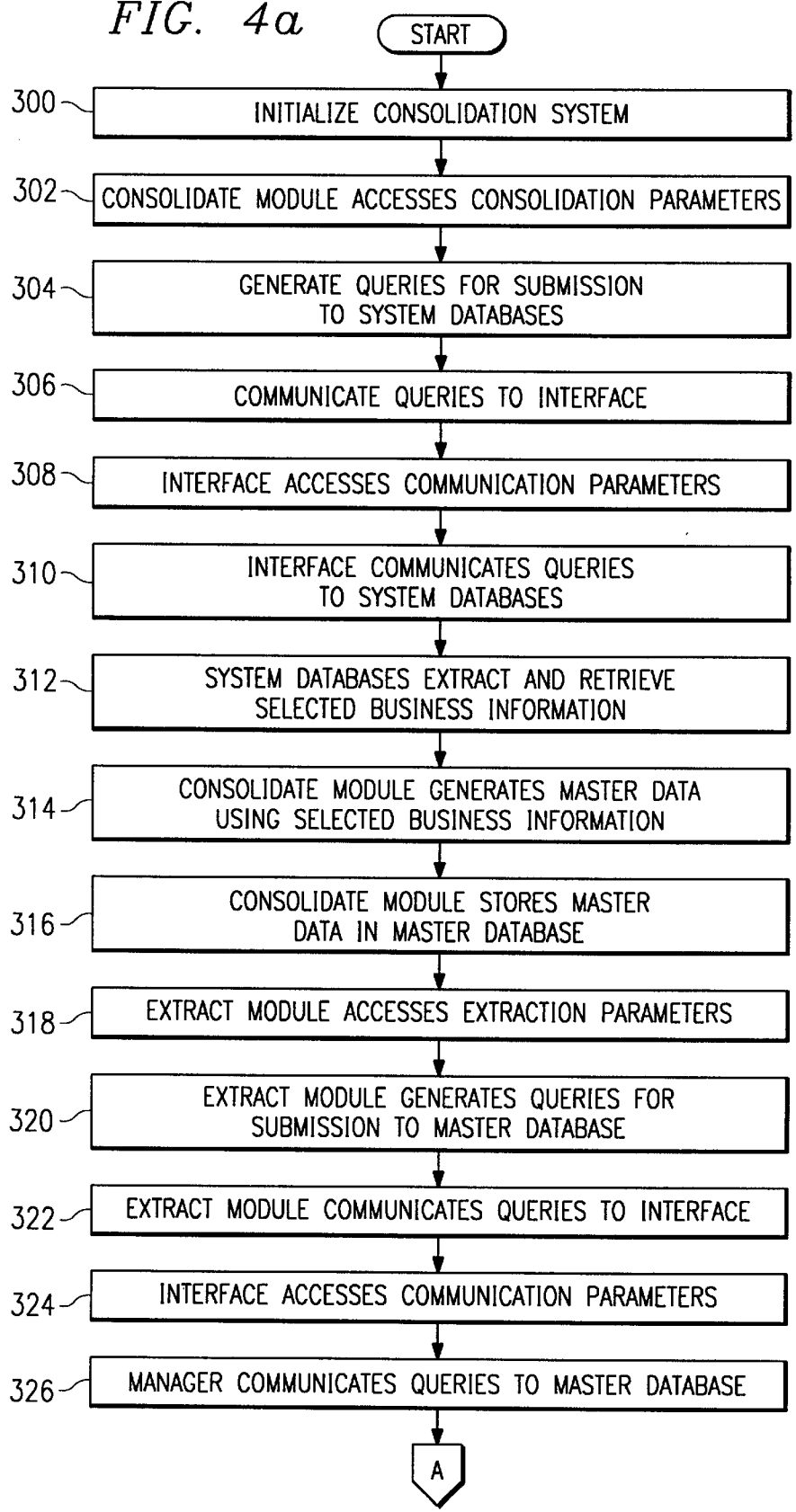

FIG. 4 illustrates an exemplary method for selecting information concerning items of business property for access by accessers 16. The method begins at step 300, where consolidation system 12 is initialized to allow consolidation system 12 to process information in accordance with the operation of system 10. Consolidate module 30 accesses extraction parameters 32 at step 302 and, at step 304, generates queries for submission to system databases 24, 26, and 28 in accordance with extraction parameters 32. Consolidate module 30 communicates the queries to interface 29 at step 306. Interface 29 accesses communication parameters 31 at step 308 and communicates the queries to system databases 24, 26, and 28 at step 310.

At step 312, system databases 24, 26, and 28 and associated DBMS 25 retrieve selected business information in accordance with the queries generated for submission to system database 24, 26, and 28 by consolidate module 30. Consolidate module 30 generates master data 36 for items using the retrieved business information at step 314 and stores master data 36 in master database 34 at step 316.

One or more extract modules 60 that correspond to one or more managers 14 access extraction parameters 62 at step 318 and, at step 320, generate queries for submission to master database 34 in accordance with extraction parameters 62. A coordinating manager 14 may coordinate, control, or otherwise direct other managers 14 in retrieving master data 36 from master database 34. Although managers 14 may interact with consolidation system 12 and master database 34 serially, more or less simultaneously, or in any other temporal relationship, the method is discussed with respect to a single manager 14.

Extract module 60 communicates queries to interface 20 at step 322. At step 324, interface 20 accesses communication parameters 21 to allow manager 14 to communicate the queries to master database 34 at step 326. Master database 34 extracts and retrieves master data 36 from master database 34 at step 328 and, at step 330, extract module 60 generates site data 74 for items using the retrieved master data 36. At step 332, extract module 60 stores the site data 74 in site database 68.

Access module 80 generates queries for submission to site database 68 at step 334 according to specified parameters. In one embodiment, the items for which access module 80 generates queries include excess or other items that are available for matching to recipients within or outside the organization. Site database 68 and associated DBMS 76 extract and retrieve site data 74 for items at step 336 and, at step 338, access module 80 generates access data 42 for items using the retrieved site data 74. At step 340, access module 80 stores access data 42 in access database 40 and the method ends.

FIG. 5 illustrates an exemplary method for providing access to selected information concerning items of business property. The method begins at step 400, where accessers 16 generate access requests at any time before, during, or after access data 42 is generated and stored in access database 40. At step 402, an accesser 16 communicates an access request to managers 14. Manager 14 receives the access request from accesser 16 at step 404 and, at step 406, manager 14 provided accesser 16 with access to access data 42.

As discussed above with reference to FIG. 1, managers 14 may coordinate, control, or otherwise direct other managers 14 according to a heirarchy or other arrangement to receive an access request from accesser 16 at step 404 and provide accesser 16 with access to access data 42 at step 406. For example, a first manager 14 associated with accesser 16 may receive the access request at step 404 and communicate the access request to a second manager 14 that provides accesser 16 with access to access data 42 at step 406. Accesser 16 may communicate an access request to a coordinating manager 14 at step 402 that directs the access request to a particular manager 14 assigned to or otherwise associated with accesser 16. Accesser 16 may communicate an access request to a coordinating manager 14 at step 402 that provides accesser 16 with access to access data 42 received from one or more other managers 14. One or more managers 14 may combine to provide accesser 16 with access to access data 42 at step 406 in any suitable manner.

At step 408, manager 14 receives item requests from accesser 16. At step 410, manager 14 matches an excess or otherwise available item to a recipient associated with the item request in accordance with the item request, access data 42, and other suitable factors. Accesser 16 may interact with manager 14 to browse, view, examine, consult, act upon, download, or otherwise operate on access data 42 to match an item to a recipient associated with accesser 16 at step 410. Manager 14 may match items to recipients associated with item requests or accessers 16 at step 410 using any of the techniques discussed in copending Application Ser. No. 08/664,332, entitled "Automated System and Method for Matching an Item of Business Property to a Recipient," filed Jun. 14, 1996. After an item is matched to a recipient at step 410 in some manner, the method ends.

Figure 6:
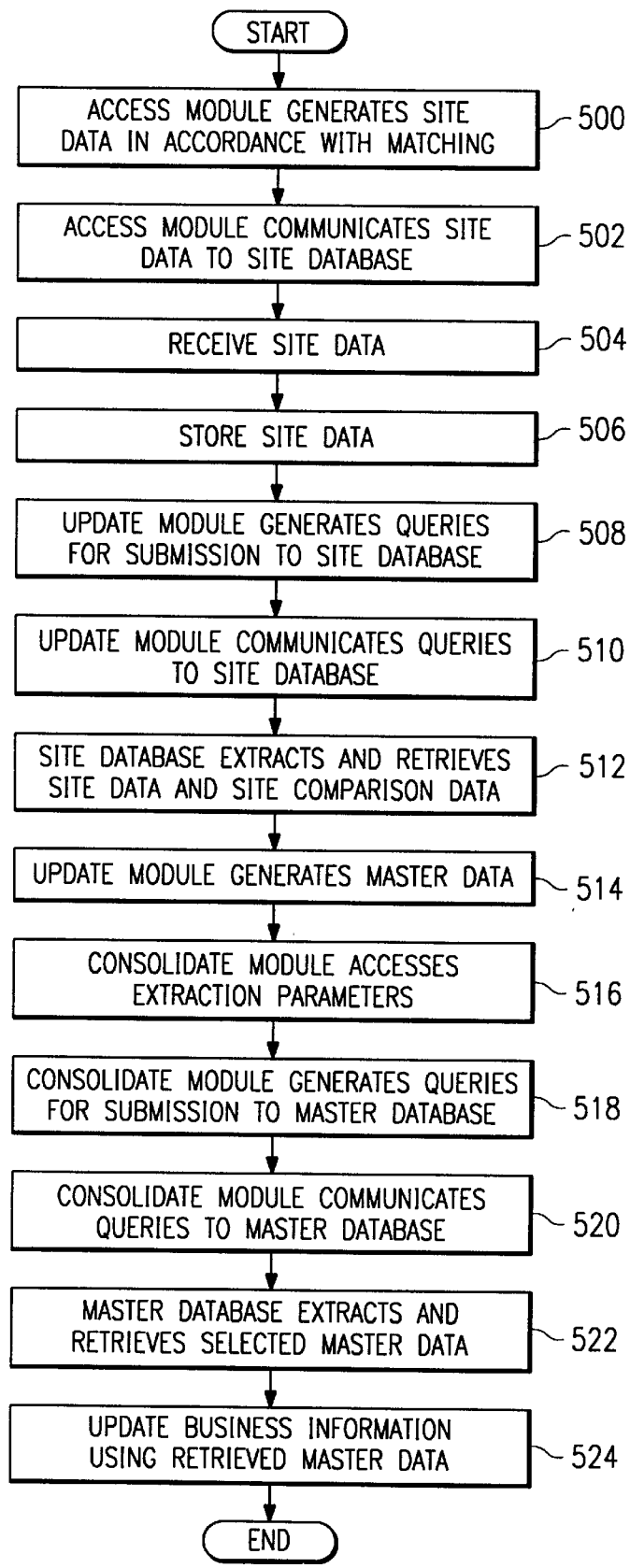
FIG. 6 illustrates an exemplary method for updating selected information concerning an item of business property.

FIG. 6 illustrates an exemplary method for updating selected information concerning items of business property according to activities of managers 14, accessers 16, and other associated persons or components. The method begins at step 500, where access module 80 generates updated site data 74 in accordance with the matching of an item to a recipient, such as a new SBU identifier 206, new location identifier 208, new contact identifier 218, new contact communications information 220, or other site data 74 to overlay, replace, or combine with previous site data 74 within site database 68. Access module 80 communicates site data 74 to site database 68 at step 502. Site database 68 and associated DBMS 76 receive site data 74 at step 504 and store site data 74 at step 506.

Update module 64 generates queries for submission to site database 68 at step 508 according to specified parameters, at specified times or intervals, in response to specified events, or in any other suitable manner. For example, update module 64 may generate queries at step 508 to extract and retrieve site data 74 or site comparison data 75 from site database 68 on a weekly or other periodic basis. In one embodiment, update module 64 generates queries at step 508 for all items for which the corresponding site data 74 or site comparison data 75 was created, generated, added to, deleted, completed, modified, or operated on in some manner by manager 14, as indicated by one or more update flags or other indicators. Update module 64 communicates the queries to site database 68 at step 510 and, at step 512, site database 68 and associated DBMS 76 extract and retrieve selected site data 74 and site comparison data 75 according to the queries.

At step 514, update module 64 generates updated master data 36 for the items using the retrieved site data 74 and site comparison data 75 for communication to master database 34 to wholly or partially overlay, replace, or combine in some manner with previous master data 36 contained in master database 34. In one embodiment, updated master data 36 generated by update module 64 is identical to or duplicates, matches, resembles, or otherwise represents, in whole or in part, site data 74 or site comparison data 75. In a particular embodiment, update module 64 directly stores site data 74 or site comparison data 75 as updated master data 36 in master database 34.

Consolidate module 30 accesses extraction parameters 32 at step 516 and, at step 518, generates queries for submission to master database 34 in accordance with one or more extraction parameters 32. Consolidate module 30 communicates the queries to master database 34 at step 520. At step 522, master database 34 and associated DBMS 38 extract and retrieve selected master data 36 in accordance with the queries generated by consolidate module 30. Consolidate module 30 updates the business information contained in system databases 24, 26, and 28 at step 524 using the retrieved master data 36 to properly reflect various aspects of and changes to the ongoing relationship between the corresponding items and the organization, and the method ends.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An automated system for providing access data concerning an item of business property available for matching to a recipient, comprising:
   a master database containing master data identified with the item and generated using information retrieved from a system database;
   a site database containing site data identified with the item and generated using master data retrieved from the master database;
   an accesser operable to provide an access request, the accesser being restricted from accessing the master data; and
   a manager coupled to the master database and operable to retrieve selected master data from the master database, the manager further operable to generate the site data and retrieve selected site data from the site database, the manager further operable to generate access data identified with the item using the retrieved site data, the manager further operable to receive the access request and, in response, to provide the accesser with access to the access data for purposes of matching the item to the recipient.

2. The system of claim 1,
   wherein the site database further contains site comparison data identified with the item, the site comparison data reflecting a comparison selected from the group consisting of:
   a comparison between the master data and previous master data identified with the item; and
   a comparison between the master data and previous site data identified with the item.

3. The system of claim 1, wherein the manager is operable to retrieve the selected master data according to a strategic business unit identifier that identifies a cost center within a business organization associated with the item.

4. The system of claim 1, wherein the automated system comprises an inventory management system and the item of business property is an excess item of business inventory.

5. The system of claim 1, wherein the manager is further operable to update the master data contained in the master database to reflect modifications to the access data.

6. The system of claim 1, wherein the accesser comprises a first accesser and a second accesser.

7. The system of claim 1, wherein the manager comprises a first manager and a second manager.

8. The system of claim 1, wherein the manager comprises a first manager and a second manager, the first manager operable to direct the access request to the second manager, the second manager operable to provide the accesser with the access data.

9. An automated method for providing access data concerning an item of business property available for matching to a recipient, comprising:
   retrieving information identified with the item from a system database;
   generating master data identified with the item using the information retrieved from the system database;
   storing the master data in a master database;
   retrieving selected master data from the master database;
   generating site data identified with the item using the retrieved master data;
   storing the site data in a site database;
   retrieving selected site data from the site database;
   generating access data identified with the item using the retrieved site data;
   receiving an access request from an accesser that is restricted from accessing the master data; and
   providing the accesser with access to the access data in response to the access request for purposes of matching the item to the recipient.

10. The method of claim 9, wherein the selected master data is retrieved in accordance with a strategic business unit identifier that identifies a cost center within a business organization associated with the item.

11. The method of claim 9, further comprising:
    generating site comparison data that is identified with the item and reflects a comparison selected from the group consisting of:
    a comparison between the master data and previous master data identified with the item; and
    a comparison between the master data and previous site data identified with the item.

12. The method of claim 9, wherein the method is performed using an automated inventory management system and the item of business property is an excess item of business inventory.

13. The method of claim 9, wherein the step of receiving an access request comprises:
    receiving an access request at a first manager; and
    forwarding the access request to a second manager, the second manager providing the accesser with the access data.

14. The method of claim 9, further comprising the step of updating the master data contained in the master database to reflect modifications to the access data.

15. An automated method for providing access data concerning an excess item of business inventory available for matching to a recipient, comprising:
    retrieving information identified with the excess item from a plurality of system databases;
    generating master data identified with the excess item using information retrieved from the system databases;
    storing the master data in a master database;
    generating a query;
    submitting the query to the master database;
    retrieving selected master data from the master database according to the query;
    generating site data identified with the excess item using the retrieved master data;
    storing the site data in a site database;
    generating site comparison data that is identified with the excess item and reflects a comparison selected from the group consisting of:
    a comparison between the master data and previous master data identified with the excess item, and
    a comparison between the master data and previous site data identified with the excess item;
    retrieving selected site data from the site database;
    generating access data identified with the excess item using the retrieved site data;
    receiving an access request from an accesser that is restricted from accessing the master data and the site data; and
    providing the accesser with access to the access data in response to the access request for purposes of matching the excess item of business inventory to the recipient.

16. The method of claim 15, further comprising:

generating queries for submission to the system databases; and retrieving selected business information for the item according to the queries for storage in the master database.

17. The method of claim 15, further comprising the step of matching the item to a recipient associated with the accesser.

18. The method of claim 15, further comprising the step of updating the master data contained in the master database to reflect modifications to the access data.

19. The method of claim 15, wherein the step of receiving an access request comprises:

receiving an access request at a first manager; and forwarding the access request to a second manager, the second manager providing the accesser with the access data.

20. The method of claim 15, wherein the method is performed using an automated inventory management system.

* * * * *